United States Patent
Wichman et al.

(10) Patent No.: US 6,665,334 B1
(45) Date of Patent: Dec. 16, 2003

(54) RECEPTION METHOD AND A RECEIVER

(75) Inventors: Risto Wichman, Helsinki (FI); Ari Hottinen, Espoo (FI)

(73) Assignee: Nokia Mobile Phones Ltd., Espoo (FI)

( * ) Notice: Subject to any disclaimer, the term of this patent is extended or adjusted under 35 U.S.C. 154(b) by 0 days.

(21) Appl. No.: 09/380,149

(22) PCT Filed: Feb. 25, 1998

(86) PCT No.: PCT/FI98/00174

§ 371 (c)(1),
(2), (4) Date: Aug. 25, 1999

(87) PCT Pub. No.: WO98/38805

PCT Pub. Date: Sep. 3, 1998

(30) Foreign Application Priority Data

Feb. 28, 1997 (FI) .................................................. 970887

(51) Int. Cl.[7] .............................. H04B 1/69; H03D 1/00
(52) U.S. Cl. ........................ 375/148; 375/152; 375/343
(58) Field of Search ................................ 375/148, 203, 375/142, 147, 149, 152, 343, 346, 349, 350; 370/18

(56) References Cited

U.S. PATENT DOCUMENTS

| | | | |
|---|---|---|---|
| 5,257,257 A | 10/1993 | Chen et al. ................. 370/18 |
| 5,394,391 A | 2/1995 | Chen et al. ................. 370/18 |
| 5,416,435 A | 5/1995 | Jokinen et al. ............. 327/113 |
| 5,420,889 A | 5/1995 | Juntti ........................ 375/346 |
| 5,426,670 A | 6/1995 | Leppanen et al. .......... 375/343 |
| 5,440,597 A | 8/1995 | Chung et al. ............... 375/200 |
| 5,491,718 A | 2/1996 | Gould et al. ................ 375/205 |
| 5,533,013 A | 7/1996 | Leppanen ................... 370/18 |
| 5,548,616 A | 8/1996 | Mucke et al. .............. 375/295 |
| 5,550,893 A | 8/1996 | Heidari ...................... 379/59 |
| 5,553,062 A | * | 9/1996 | Schilling et al. ............ 370/18 |
| 5,566,201 A | 10/1996 | Ostman ...................... 375/200 |
| 5,589,795 A | 12/1996 | Latva-Aho .................. 327/553 |
| 5,590,160 A | 12/1996 | Ostman ...................... 375/367 |
| 5,596,571 A | 1/1997 | Gould et al. ................ 370/335 |
| 5,654,980 A | 8/1997 | Latva-aho et al. .......... 375/208 |
| 5,703,873 A | 12/1997 | Ojanpera et al. ........... 370/332 |
| 5,715,279 A | 2/1998 | Laakso et al. .............. 375/224 |
| 5,724,378 A | * | 3/1998 | Miki et al. .................. 375/200 |
| 5,754,541 A | * | 5/1998 | Glisic et al. ................ 370/335 |
| 5,812,546 A | * | 9/1998 | Zhou et al. ................. 370/342 |
| 5,815,801 A | 9/1998 | Hamalainen et al. ........ 455/63 |
| 5,881,097 A | * | 3/1999 | Lilleberg et al. ............ 375/203 |
| 5,887,252 A | 3/1999 | Noneman .................... 455/414 |
| 5,905,946 A | 5/1999 | Lilleberg et al. ............ 455/63 |
| 6,069,912 A | * | 5/2000 | Sawahashi et al. ......... 375/142 |
| 6,088,383 A | * | 7/2000 | Suzuki et al. ............... 375/148 |

FOREIGN PATENT DOCUMENTS

| EP | EP 0717505 A2 | 6/1996 |
|---|---|---|
| WO | WO 95/22208 | 8/1995 |

OTHER PUBLICATIONS

PCT International Search Report.
Finnish Office Action.

* cited by examiner

*Primary Examiner*—Stephen Chin
*Assistant Examiner*—Sam K. Ahn
(74) *Attorney, Agent, or Firm*—Perman & Green, LLP

(57) ABSTRACT

A reception method and receiver in a system employing a CDMA method, which comprises means for digitizing a received transmission. The received transmission comprises a desired signal and a plurality of interfering signals, which signals are each multiplied by a code of a known code set. To cancel effectively the multiple access interference, the receiver comprises means for canceling at least some of the interfering signals from the desired signal, and means for detecting the desired signal after transmission, and means for canceling the effect of the interference signals from the desired signal.

10 Claims, 2 Drawing Sheets

RECEPTION METHOD AND A RECEIVER

FIELD OF THE INVENTION

The present invention relates to a reception method in a system employing a code division multiple access method, in which a received transmission is digitized, the received transmission comprising a desired signal and a plurality of interfering signals, which signals are each multiplied by a code of a known plurality of codes and in which method at least some of the signals interfering with the desired signal are cancelled and the desired signal is detected after the interference cancellation.

DESCRIPTION OF THE PRIOR ART

The present invention can specifically be applied to CDMA data communication systems. CDMA is a multiple access method based on a spread spectrum technique, and it has been recently put into use in cellular radio systems in addition to previously used FDMA and TDMA. CDMA has many advantages over the prior methods, such as simplicity of frequency planning and spectrum efficiency.

In the CDMA method, the narrowband data signal of the user is multiplied to a relatively wide band by a spreading code having a considerably broader band than the data signal. In known test systems, bandwidths such as 1.25 MHz, 10 MHz and 25 MHz have been used. In connection with multiplying, the data signal spreads to the entire band to be used. All users transmit by using the same frequency band simultaneously. A separate spreading code is used over each connection between a base station and a mobile station, and the signals of different users can be distinguished from one another in the receivers on the basis of the spreading code of each user. The intention is to select the spreading codes in such a way that they are mutually orthogonal, i.e. they do not correlate with one another.

Correlators in conventionally implemented CDMA receivers are synchronized with a desired signal which they recognize on the basis of the spreading code. In the receiver the data signal is restored to the original band by multiplying it by the same spreading code as in the transmission step. Ideally, the signals that have been multiplied by some other spreading code do not correlate and are not restored to the narrow band. In view of the desired signal, they thus appear as noise. The object is to detect the signal of a desired user from among a number of interfering signals. In practice, the spreading codes correlate, and the signals of other users make the detection of the desired signal more difficult by distorting the received signal linearly. This interference caused by the users to one another is called multiple access interference.

Several reception methods have been developed to eliminate the deterioration of the signal quality caused by the multiple access interference. These comprise both a conventional one user reception and methods allowing a simultaneous multiuser detection. In a conventional one user reception the received transmission is correlated with a linear, matched filter which ignores all other signals in the transmission than that of a desired user. This is simple to implement, but it is susceptible to a so called near-far phenomenon, in which a transmitter close to a base station may jam the signals of transmitters located farther away.

An optimal multiuser detector (MUD) comprises a plurality of linear, matched filters and a Viterbi-detector. One known linear multiuser detector is a LS detector (least squares detector) which is called a decorrelating detector. This detector requires mutual cross-correlations of codes used. Also other linear detectors have been developed, based on a criterion of the minimum mean square error (MMSE). These methods are also akin to subspace methods, the aim of which is to estimate the signal subspace of a received signal. A drawback of these methods is the complexity which grows exponentially with the number of users.

BRIEF DESCRIPTION OF THE INVENTION

The purpose of the present invention is to provide a reception method with which the drawbacks of known methods can be eliminated. The purpose of the invention is to provide a reception method and a receiver that is not too complicated to implement and that cancels efficiently the effect of multiuser interference from a desired signal.

This is achieved with a method of the type described in the preamble, the method being characterized in that the number of interfering signals and the codes used by them are estimated in a received transmission, and the effect of perceived signals are cancelled from a desired signal.

The invention also relates to a receiver in a system employing a code division multiple access method, the receiver comprising means for digitizing a received transmission comprising a desired signal and a plurality of interfering signals, each multiplied by a code of a known code set, and which receiver comprises means for cancelling at least some of the interfering signals from the desired signal and means for detecting the desired signal after the interference cancellation. The receiver in accordance with the invention is characterized in that it comprises means for estimating the number of interfering signals and the codes used by them, in a received transmission, and means for cancelling the effect of perceived signals from the desired signal.

Several advantages are achieved with the method of the invention. To function, the method of the invention only needs information on code set used. For instance, information on the codes of active users or the number of users need not to be signalled to the receiver. Thus the signalling load of the system does not increase. The method of the invention is not susceptible to errors either. In case the number of errors grows in estimation for some reason or other, the quality of the signal does not change suddenly, but the quality deteriorates gradually.

The codes and number of active users need not necessarily be estimated in connection with every symbol detection either, since these parameters change slowly as compared with the symbol speed. As a consequence the processing capacity required can be reduced, if desired. Thus the method can be applied with a desired accuracy Depending on the processing capacity of a receiver concerned.

DESCRIPTION OF THE DRAWINGS

In the following the invention will be described in greater detail with reference to the examples in accordance with the accompanying drawings, in which.

DESCRIPTION OF PREFERRED EMBODIMENTS

Figure 1:
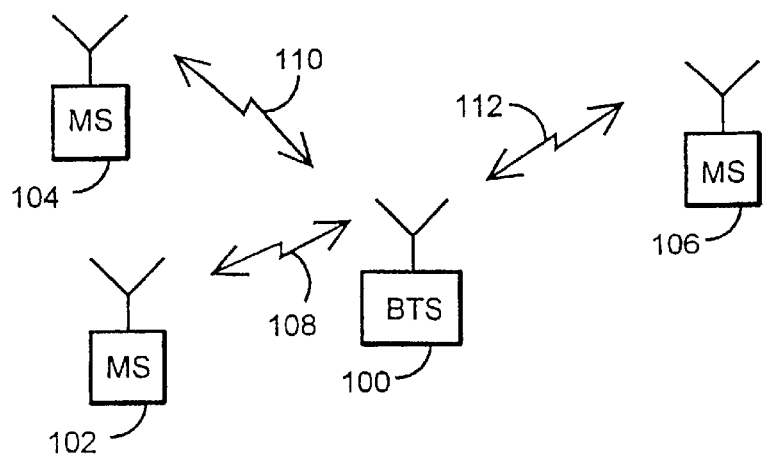
FIG. 1 illustrates a system where the invention can be employed.

The present invention can thus be applied to systems employing a code division multiple access method, for example, to a cellular radio system. FIG. 1 illustrates an example of the structure of a typical CDMA radio system as concerns one cell. In one cell, the system typically comprises one base station 100 and a plurality of terminals 102 to 106 having bidirectional connections 108 to 112 with the base station. A separate frequency band used by all terminals is reserved for both transmission directions (downlink and uplink).

It is assumed in the following example that the invention is applied to a terminal 102. The terminal receives a signal 108 from a base station 100. Since the same frequency band is in use for all connections, the composite signal received by the terminal 102 also comprises signals 110 and 112 that are intended for terminals 104 and 106. When sending the signals, the base station has multiplied a signal intended for each terminal by a spreading code used in the connection concerned. Thus each connection uses a separate spreading code that differs from others, the codes having been selected in such a way that they interfere with one another as little as possible, in other words that they are as mutually orthogonal as possible. The spreading codes in use in the base stations at any given time form a code set.

In a terminal the composite signal received is converted from a radio frequency into an intermediate frequency and is sampled. To find out delays of signal components an impulse response of the signal is measured, after which the signal is supplied to a plurality of matched filters of the prior art, ;where adequate parameters for detection are calculated, the number of parameters being in the range of $M=\Sigma_i K_i L_i$, where $K_i$ and $L_i$ refer to the number of code sets and propagation paths of a base station i. Thus the received signal comprises signals intended for a plurality of terminals, which signals have propagated multipath-wise on the radio path.

For interference cancellation, the purpose of the receiver is first to find out the number of active users and the codes by which the user signals have been multiplied. The receiver is aware of the code set used by the base station. The receiver determines the number of active users and interfering users on the basis of the outputs of the matched filters. There are different alternatives that can be applied. The received signal is observed by means of a sliding observation window. This means that a certain number of samples is selected, for instance ten successive samples, and the decision is made on the basis of the outputs of the matched filters using these ten samples.

The number of signals and the codes used are estimated by correlating a received transmission by a plurality of matched filters with the codes of a known code set, the results obtained are averaged over a predetermined time window, i.e. over the number of samples, the averaged filter outputs are compared with a predetermined threshold value, and the codes whose power exceeds the predetermined threshold value are selected. Or, if a receiver is designed, for instance, for the interference cancellation of ten users, the ten interference paths worst exceeding the threshold are located, and they are included in the interference cancellation.

In another alternative of the invention, the number of interfering signals and the codes used are estimated by correlating the received transmission by a plurality of matched filters with the codes of a known code set, one sample at a time for a predetermined time window, the results obtained are arranged sample-specifically in the order of magnitude, and the codes and paths that appear most frequently among the strongest ones are selected. For example, if the length of a time window is ten samples, and the output of a matched filter corresponding to any one code appears at least, say, five times among, for instance, the four strongest ones, so it can be assumed that the code concerned is in use in some interfering connection. When this method is employed, no predetermined threshold values are needed. In the above example the numerical values used are given just by way of an example.

When the number of interfering connections and the codes used in the connections have been determined, the task is to cancel the effect of interference from a desired signal. For this purpose, the cross-correlations between codes have to be calculated with measured delays.

The mutual cross-correlations with different delays between codes of a known code set can be stored in advance in the memory of a receiver, and when removing the effect of perceived signals from a desired signal the cross-correlation between the codes is calculated with the delay difference of each code using the correlation values stored in the memory. Another alternative is to calculate the cross-correlations directly whenever needed. In this case the number of calculations increases, but on the other hand, the memory is needed substantially less.

In one embodiment of the invention a function of the cross-correlation matrix, for instance its inverse matrix or the mutual cross-correlations with different delay values, between the codes of a known code set, on the accuracy of spreading code bit duration, are stored in advance in the memory of a receiver. If a delay difference is between two pre-stored values, the correct value is obtained by interpolation from the values stored in the memory.

Figure 2:
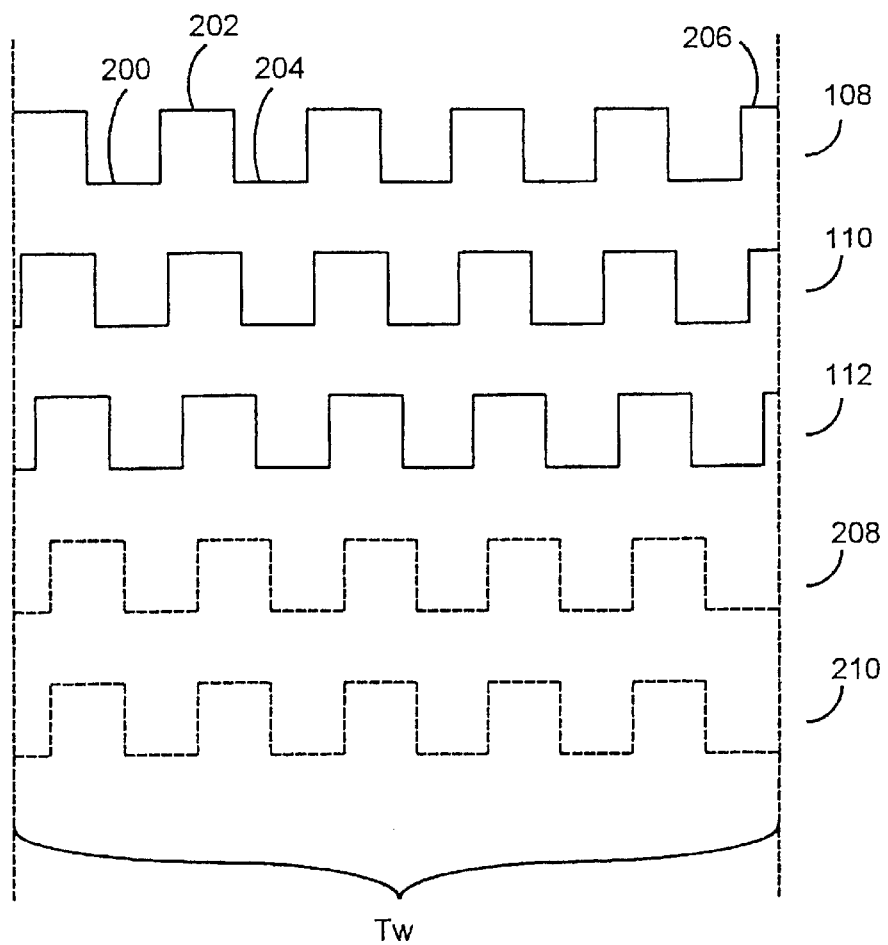
FIG. 2 illustrates the use of a time window.

The example illustrated in FIG. 1 is further studied in view of a terminal 102. Thus the terminal 102 receives from a base station a signal 108 whose spreading code it naturally recognizes, as well as it recognizes the code set used in the base station. Naturally, the terminal also receives all other signals of the base station transmitted with the same frequency, in this case the signals 110 and 112 intended for the terminals 104 and 106. However, the terminal 102 is not aware of the existence of these signals beforehand, but it regards these signals as unidentified interference. Thus in the solution of the invention the terminal works out the number of signals and spreading codes used by them in the above-described ways. FIG. 2 illustrates this process. The received composite signal is thus examined by utilizing a sliding time window. In FIG. 2, it is assumed that a time window $T_w$ measures ten samples. The desired signal 108 comprises symbols 200 to 206. The terminal goes through the code set used in the base station by means of the matched filter bank, and observes that a good correlation is found to some specific spreading codes these correlations correspond to the signals 110 and 112. When other spreading codes 208, 210 are used, high effective values do not appear in the outputs of the matched filters. The time window is then shifted for a desired number of samples and the measuring is performed again, and this is repeated a desired number of times. From these results the terminal is able to deduce the number of interfering signals and the codes used by them, and on the basis of this information the interference cancellation can be performed.

Figure 3:
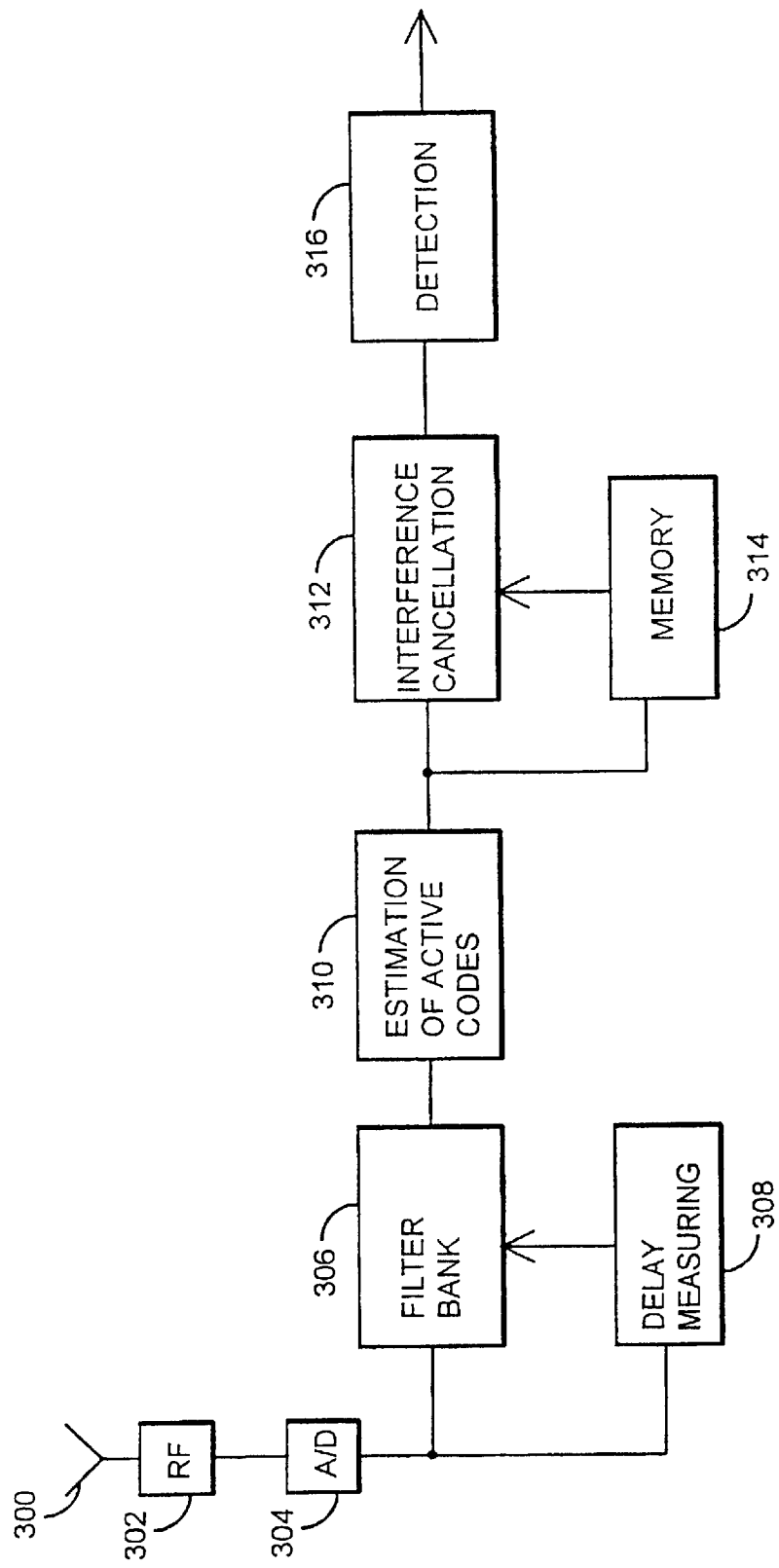
FIG. 3 is a block diagram illustrating the structure of a receiver in accordance with the invention.

FIG. 3 is a block diagram illustrating an example of a structure of a receiver according to the invention. A receiver comprises an antenna 300 supplying a received signal through radio frequency parts 302 to sampling means 304, typically to an analog-to-digital converter where the signal is sampled with a desired sampling frequency. A sampled signal is applied to a filter bank 306 comprising a plurality of matched filters. The matched filters can be implemented with solutions of the prior art. From the sampling means 304, the sampled signal is also applied to delay estimating means 308 where an impulse response is calculated by using known methods. Estimated delays are applied to the filter bank 306.

In the filter bank the received transmission is correlated with codes of a predetermined code set. The output of the filter bank is applied to processing means 310 which estimate the number of interfering signals and the codes used by them from the received transmission, by using the above-described methods. The processing means 310 can preferably be implemented program-wise, for example, by means of a signal or general processor, or alternatively, by detached components, which is obvious to one skilled in the art.

In the processing means 310 the results received from the filter bank 306 can thus be averaged over a predetermined time window, the averaged outputs of the filters can be compared with a predetermined threshold value, and the codes whose power exceeds the predetermined threshold value can be selected.

In accordance with another preferred embodiment of the invention, in the processing means 310, the results received from the filter bank can be arranged sample-specifically in the order of magnitude, and the codes that appear most frequently among the strongest ones, during several successive measuring time windows, are selected.

Further, the receiver comprises means 312 for cancelling the effect of detected signals from a desired signal by using known methods of interference cancellation. The means 312 for interference cancellation can preferably be implemented program-wise, for example by means of a signal or general processor. The receiver also comprises memory means 314 storing the mutual cross-correlations between the codes of a known code set, with different delay values on the accuracy of spreading code bit duration. If the delay difference is between two stored values, the means 312 for interference cancellation calculate the correct value by interpolation.

Further, the receiver comprises means 316 for detecting a desired signal after the interference cancellation. The detection means 316 can be implemented with conventional methods. From the detection means the signal is applied to other parts of the receiver.

Naturally, the receiver also comprises other components, such as filters and amplifiers, which is obvious to one skilled in the art. Since they are irrelevant to the invention, they are not included in FIG. 3 nor in the description.

Even though the invention is described above with reference to the example according to the accompanying drawings, it is clear that the invention is not restricted thereto, but it may be modified in many ways within the scope of the inventive idea disclosed in the appended claims.

What is claimed is:

1. A reception method in a system employing a code division multiple access method, comprising the steps of:

receiving a transmission comprising a desired signal and a plurality of interfering signals, which signals are each multiplied by a code of a known plurality codes;

digitizing the received transmission;

estimating a number of interfering signals;

estimating the codes used by the interfering signals;

canceling the interfering signals from the desired signals;

detecting the desired signal after the interference cancellation; and further characterized in that the number of interfering signals and the codes used by them are estimated by correlating a received transmission by a plurality of matched filters (306) with the codes of a known code set, the results obtained are averaged over a predetermined time window, the averaged outputs are compared with a predetermined threshold value, and the codes whose power exceeds a predetermined threshold value are selected.

2. A method as claimed in claim 1, characterized in that the number of interfering signals and the codes used by them are estimated by correlating a received transmission by a plurality of matched filters (306) with the codes of a known code set, one sample at a time for a predetermined time window, the results obtained are arranged sample-specifically in the order of magnitude, and the codes appearing most frequently among the strongest ones are selected.

3. A method as claimed in claim 1, characterized in that the mutual cross-correlations with different delay values between codes of a known code set are stored in advance in the memory (314) of a receiver, and that when canceling the effect of perceived signals from a desired signal, the cross-correlation between the codes is calculated with the delay difference of each code using the correlation values stored in the memory.

4. A method as in claim 3, characterized in that the mutual cross-correlations with different delay values, on the accuracy of spreading code bit duration, between the codes of a known code set are stored in advance in the memory (314) of the receiver, and if a delay difference is between two pre-stored values, the correct value is obtained by interpolation.

5. A method as claimed in claim 1, characterized in that when canceling the interfering signals from the desired signals the cross-correlation between the codes is calculated with the delay difference of each code using the correlation values stored in the memory (314).

6. A receiver in a system employing a code division multiple access method, comprising means (304) for digitizing a received transmission the received transmission comprising a desired signal and a plurality of interfering signals, which signals are each multiplied by a code of a known code set, and which receiver comprises means (312) for canceling at least some of interfering signals from 15 a desired signal, and means (316) for detecting a desired signal after the interference cancellation, characterized in that a receiver comprises:

means (306,310) for estimating the number of interfering signals and the codes used by them in the received transmission, means (312) for canceling the interfering signals from the desired signals and detecting the desired signal after the interference cancellation; and further characterized in that a receiver also comprises a plurality of estimation means (306) for correlating a received transmission by a plurality matched filters with the codes of a known code set, means (310) for averaging the results obtained over a predetermined time window, means (310) for comparing the averaged outputs of filters with a predetermined threshold value, and means (310) for selecting the codes whose power exceeds the predetermined threshold value.

7. A receiver as claimed in claim 6, characterized in that a receiver also comprises a plurality of estimation means (306) for correlating a received transmission by a plurality of matched filters with the codes of a known code set, one sample at a time, for a predetermined time window, means (310) for arranging the results obtained sample-specifically in the order of magnitude, and means (310) for selecting the codes appearing most frequently among the strongest ones.

8. A receiver as claimed in claim 6, characterized in that a receiver also comprises memory means (314) for storing the mutual cross-correlations between the codes of a known code set with different delay values, on the accuracy of spreading code bit duration.

9. A reception method in a system employing a code division multiple access method, comprising the steps of:
   receiving a transmission comprising a desired signal and a plurality of interfering signals, which signals are each multiplied by a code of the known plurality of codes;
   digitizing the received transmission;
   estimating a number of interfering signals;
   estimating the codes used by the interfering signals;
   canceling the interfering signals from the desired signals; and
   detecting the desired signal after the interference cancellation, wherein the number of interfering signals and codes used by the interfering signals are estimated by:
      correlating a received transmission by a plurality of matched filters with a known set of codes;
      averaging results obtained over a predetermined time window;
      comparing averaged outputs with a threshold value; and
      selecting the codes whose power exceeds a threshold value.

10. A receiver in a system employing a code division multiple access method, comprising:
   means for digitizing a received transmission the received transmission comprising a desired signal and a plurality of interfering signals, which signals are each multiplied by a code of a known code set, and which receiver comprises means for canceling at least some of interfering signals from a desired signal; and
   means for detecting a desired signal after the interference cancellation, wherein the receiver further comprises:
      means for estimating a number of interfering signals and the codes used by them in the received transmission;
      means for canceling the interfering signals from the desired signals and detecting the desired signal after the interference cancellation;
      a plurality of estimation means for correlating a received transmission by a plurality of matched filters with codes of a known code set;
      means for averaging results obtained over a time window;
      means for comparing averaged outputs of the matched filters with a threshold value; and
      means for selecting codes whose power exceeds the threshold value.

* * * * *